US006785001B2

(12) United States Patent
Almarzouk et al.

(10) Patent No.: US 6,785,001 B2
(45) Date of Patent: Aug. 31, 2004

(54) METHOD AND APPARATUS FOR MEASURING WAVELENGTH JITTER OF LIGHT SIGNAL

(75) Inventors: Kais Almarzouk, Tustin, CA (US); Dinesh Maheshwari, Fremont, CA (US)

(73) Assignee: Silicon Light Machines, Inc., Sunnyvale, CA (US)

( * ) Notice: Subject to any disclaimer, the term of this patent is extended or adjusted under 35 U.S.C. 154(b) by 549 days.

(21) Appl. No.: 09/934,050

(22) Filed: Aug. 21, 2001

(65) Prior Publication Data

US 2003/0038943 A1 Feb. 27, 2003

(51) Int. Cl.[7] ............................. G01B 9/02; G02B 27/00
(52) U.S. Cl. ...................... 356/451; 356/517; 356/521; 359/129; 359/577
(58) Field of Search ............................ 356/521, 450, 356/517, 481, 451; 359/129, 577

(56) References Cited

U.S. PATENT DOCUMENTS

| RE16,767 E | 10/1927 | Jenkins |
| RE25,169 E | 5/1962 | Glenn |
| D334,557 S | 4/1993 | Hunter et al. |

(List continued on next page.)

FOREIGN PATENT DOCUMENTS

| DE | 32 33 195 A1 | 3/1983 |
| DE | 43 23 799 A1 | 1/1994 |

(List continued on next page.)

OTHER PUBLICATIONS

Hecht, *Optics*, Addison–Wesley, 2$^{nd}$ edition, 1987, pp. 358–360.
Solgaard, O., *Integrated semiconductor light modulators for fiber–optic and display applications*, Ph.D. Dissertation, Stanford University, Feb. 1992.

(List continued on next page.)

*Primary Examiner*—Samuel A. Turner
*Assistant Examiner*—Patrick Connolly
(74) *Attorney, Agent, or Firm*—Okamoto & Benedicto LLP

(57) ABSTRACT

An apparatus for detecting wavelength change of a first light signal comprises an amplitude splitting interferometer and a detector. The amplitude splitting interferometer comprises first and second optical paths. The first optical path has a first index of refraction that varies with wavelength over a first wavelength band. The second optical path has a second index of refraction that is relatively constant over the first wavelength band. In operation the first light signal enters and exits the amplitude splitting interferometer forming interference light. The interference light couples to the detector which detects the wavelength change of the first light signal from the interference light. An interferometer comprises a first beam splitter, third and fourth optical paths, and a second beam splitter. The third optical path is optically coupled to the first beam splitter and has a third index of refraction that varies with wavelength over a second wavelength band. The fourth optical path is optically coupled to the first beam splitter and has a fourth index of refraction that is relatively constant over the second wavelength band. The second beam splitter is optically coupled to the first and second optical paths such that in operation an incident light enters the first beam splitter and exits the second beam splitter forming an output light and further such that in operation a change in wavelength of the incident light within the wavelength band causes a change in interference of the output light.

31 Claims, 6 Drawing Sheets

U.S. PATENT DOCUMENTS

| | | |
|---|---|---|
| D334,742 S | 4/1993 | Hunter et al. |
| D337,320 S | 7/1993 | Hunter et al. |
| 5,311,360 A | 5/1994 | Bloom et al. |
| 5,459,610 A | 10/1995 | Bloom et al. |
| 5,504,575 A | 4/1996 | Stafford |
| 5,661,592 A | 8/1997 | Bornstein et al. |
| 5,757,536 A | 5/1998 | Ricco et al. |
| 5,808,797 A | 9/1998 | Bloom et al. |
| 5,841,579 A | 11/1998 | Bloom et al. |
| 5,949,570 A | 9/1999 | Shiono et al. |
| 6,061,166 A | 5/2000 | Furlani et al. |
| 6,169,624 B1 | 1/2001 | Godil et al. |
| 6,172,796 B1 | 1/2001 | Kowarz et al. |
| 6,181,458 B1 | 1/2001 | Brazas, Jr. et al. |
| 6,188,519 B1 | 2/2001 | Johnson |
| 6,215,579 B1 | 4/2001 | Bloom et al. |
| 6,219,015 B1 | 4/2001 | Bloom et al. |
| 6,646,745 B2 * | 11/2003 | Verma et al. ............... 356/450 |

FOREIGN PATENT DOCUMENTS

| | | |
|---|---|---|
| DE | 197 23 618 A1 | 12/1997 |
| DE | 197 51 716 A1 | 5/1998 |
| DE | 198 46 532 C1 | 5/2000 |
| EP | 0 089 044 A2 | 9/1983 |
| EP | 0 261 901 A2 | 3/1988 |
| EP | 0 314 437 A1 | 10/1988 |
| EP | 0 304 263 A2 | 2/1989 |
| EP | 0 306 308 A2 | 3/1989 |
| EP | 0 322 714 A2 | 7/1989 |
| EP | 0 627 644 A3 | 9/1990 |
| EP | 0 417 039 A | 3/1991 |
| EP | 0 423 513 A2 | 4/1991 |
| EP | 0 436 738 A1 | 7/1991 |
| EP | 0 458 316 A2 | 11/1991 |
| EP | 0 477 566 A2 | 4/1992 |
| EP | 0 488 326 A3 | 6/1992 |
| EP | 0 499 566 A2 | 8/1992 |
| EP | 0 528 646 A1 | 2/1993 |
| EP | 0 530 760 A2 | 3/1993 |
| EP | 0 550 189 A1 | 7/1993 |
| EP | 0 610 665 A1 | 8/1994 |
| EP | 0 627 644 A2 | 12/1994 |
| EP | 0 627 850 A1 | 12/1994 |
| EP | 0 643 314 A2 | 3/1995 |
| EP | 0 654 777 A1 | 5/1995 |
| EP | 0 658 868 A1 | 6/1995 |
| EP | 0 658 830 A1 | 12/1995 |
| EP | 0 689 078 A1 | 12/1995 |
| EP | 0 801 319 A1 | 10/1997 |
| EP | 0 851 492 A2 | 7/1998 |
| EP | 1 003 071 A2 | 5/2000 |
| EP | 1 014 143 A1 | 6/2000 |
| EP | 1 040 927 A2 | 10/2000 |
| GB | 2 117 564 A | 10/1983 |
| GB | 2 118 365 A | 10/1983 |
| GB | 2 266 385 A | 10/1993 |
| GB | 2 296 152 A | 6/1996 |
| GB | 2 319 424 A | 5/1998 |
| JP | 53-39068 | 4/1978 |
| JP | 55-11151 | 8/1980 |
| JP | 57-31166 | 2/1982 |
| JP | 57-210638 | 12/1982 |
| JP | 60-49638 | 3/1985 |
| JP | 60-94756 | 5/1985 |
| JP | 60-250639 | 12/1985 |
| JP | 61-142750 | 6/1986 |
| JP | 61-145838 | 7/1986 |
| JP | 63-234767 | 9/1988 |
| JP | 63-305323 | 12/1988 |
| JP | 1-155637 | 6/1989 |
| JP | 40-1155637 | 6/1989 |
| JP | 2219092 | 8/1990 |
| JP | 4-333015 | 11/1992 |
| JP | 7-281161 | 10/1995 |
| JP | 3288369 | 3/2002 |
| WO | WO 90/13913 | 11/1990 |
| WO | WO 92/12506 | 7/1992 |
| WO | WO 93/02269 | 2/1993 |
| WO | WO 93/09472 | 5/1993 |
| WO | WO 93/18428 | 9/1993 |
| WO | WO 93/22694 | 11/1993 |
| WO | WO 94/09473 | 4/1994 |
| WO | WO 94/29761 | 12/1994 |
| WO | WO 95/11473 | 4/1995 |
| WO | WO 96/02941 | 2/1996 |
| WO | WO 96/08031 | 3/1996 |
| WO | WO 96/41217 | 12/1996 |
| WO | WO 96/41224 | 12/1996 |
| WO | WO 97/22033 | 6/1997 |
| WO | WO 97/26569 | 7/1997 |
| WO | WO 98/05935 | 2/1998 |
| WO | WO 98/24240 | 6/1998 |
| WO | WO 98/41893 | 9/1998 |
| WO | WO 99/07146 | 2/1999 |
| WO | WO 99/12208 | 3/1999 |
| WO | WO 99/23520 | 5/1999 |
| WO | WO 99/34484 | 7/1999 |
| WO | WO 99/59335 | 11/1999 |
| WO | WO 99/63388 | 12/1999 |
| WO | WO 99/67671 | 12/1999 |
| WO | WO 00/04718 | 1/2000 |
| WO | WO 00/07225 | 2/2000 |
| WO | WO 01/04674 A1 | 1/2001 |
| WO | WO 01/006297 A3 | 1/2001 |
| WO | WO 01/57581 A3 | 8/2001 |
| WO | WO 02/025348 A3 | 3/2002 |
| WO | WO 02/31575 A2 | 4/2002 |
| WO | WO 02/058111 A2 | 7/2002 |
| WO | WO 02/065184 A3 | 8/2002 |
| WO | WO 02/073286 A2 | 9/2002 |
| WO | WO 02/084375 A1 | 10/2002 |
| WO | WO 02/084397 A3 | 10/2002 |
| WO | WO 03/001281 A1 | 1/2003 |
| WO | WO 03/001716 A1 | 1/2003 |
| WO | WO 03/012523 A1 | 2/2003 |
| WO | WO 03/016965 A1 | 2/2003 |
| WO | WO 03/023849 A1 | 3/2003 |
| WO | WO 03/025628 A2 | 3/2003 |

OTHER PUBLICATIONS

Apte, R.B., *Grating light valves for high resolution displays*, Ph.D. Dissertation, Stanford University, Jun. 1994.

R. Apte, "Grating Light Valves for High Resolution Displays", Solid State Sensors and Actuators Workshop, Ph D. Dissertation, Stanford University (Jun. 1994).

O. Solgaard, "Integrated Semiconductor Light Modulators for Fiber–Optic and Display Applications", Ph.D. Dissertation, Stanford University Feb., 1992.

R. Gerhard–Multhaupt, "Viscoelastic Spatial Light Modulators and Schlieren–Optical Systems for HDTV Projection Displays" SPIE vol. 1255 Large Screen Projection Displays 11 (1990), pp. 69–78.

R. Gerhard–Multhaupt, "Light–Valve Technologies for High–Definition Television Projection Displays", Displays vol. 12, No. 3/4 (1991), pp. 115–128.

O. Solgaard, F. Sandejas, and D. Bloom, "Deformable Grating Optical Modulator," Optics Letters, vol. 17, No. 9, May 1, 1992, New York, USA, pp. 688–690.

F. Sandejas, R. Apte, W. Banyai, and D. Bloom, "Surface Microfabrication of Deformable Grating Valve for High Resolution Displays," The $7^{th}$ International Conference on Solid–State Sensors and Actuators.

P. Alvelda, "High–Efficiency Color Microdisplays," SID 95 Digest, pp. 307–311, 1995.

Worboys et al., "Miniature Display Technology for Integrated Helmut Systems," GEC Journal of Research, vol. 10, No. 2, pp. 111–118, Chelmsford, Essex, GB 1993.

M. Farn et al., "Color Separation by use of Binary Optics," Optics Letters, vol. 18:15 pp. 1214–1216, 1993.

P. Alvelda, "VLSI Microdisplays and Optoelectric Technology," MIT, pp. 1–93, 1995.

P. Alvelda, "VLSI Mircodisplay Technology," Oct. 14, 1994.

D. Rowe, "Laser Beam Scanning," SPIE, vol. 2088, Oct. 5, 1993, 18–26.

L. Hornbeck, "Deformable–Mirror Spatial Light Modulators," Spatial Light Modulators and Applications III, Aug. 8, CA 1989, pp. 86–102.

Russick et al., "Supercritical Carbon Dioxide Extraction of Solvent from Micromachined Structures," Supercritical Fluids, Chapter 18, American Chemical Society, pp 255–269, 1997.

Buhler et al., "Linear Array of Complementary Metal Oxide Semiconductor Double–Pass Metal Micromirrors," Optical Engineering, vol. 36, No. 5, pp 1391–1398, May 1997.

Gani et al., "Variable Gratings for Optical Switching: Rigorous Electromagnetic Simulation and Design," Optical Engineering, vol. 38, No. 3, pp 552–557, Mar. 1999.

R. Tepe, et al. "Viscoelastic Spatial Light Modulator with Active Matrix Addressing," Applied Optics, vol. 28, No. 22, New York, USA, pp. 4826–4834, Nov. 15, 1989.

W. Brinker, et al., "Deformation Behavior of Thin Viscoelastic Layers Used in an Active–Matrix–Addressed Spatial Light Modulator," SPIE vol. 1018, pp. 79–85, Germany, 1988.

T. Utsunomiya and H. Sato, "Electrically Deformable Echellette Grating and its Application to Tunable Laser Resonator," Electronics and Communications in Japan, vol. 63–c, No. 10, pp. 94–100, Japan, 1980.

Burns, D.M. et al., *Development of microelectromechanical variable blaze gratings*, Sensors and Actuators A, pp. 7–15, 1998.

R.N. Thomas, et al., "The Mirror–Matrix Tube: A Novel Light Valve for Projection Displays", IEEE Transactions on Electron Devices, vol. ED–22, No. 9, pp. 765–775, Sep. 1975.

"Kitchen Computer", IBM Technical Disclosure Bulletin, vol. 37, No. 12, pp. 223–225, Dec. 1994.

"Image Orientation Sensing and Correction for Notepads", Research Disclosure, No. 34788, p. 217, Mar. 1993.

Beck Mason et al., "Directly Modulated Sampled Grating DBR Lasers for Long–Haul WDM Communication Systems" IEEE Photonics Technology Letters, vol. 9, No. 3, Mar. 1997. pp. 377 of 379.

N. J. Frigo et al., "A Wavelength–Division Multiplexed Passive Optical Network with Cost–Shared Components", IEEE Photonics Technology Letters, vol. 6, No. 11, Nov. 1994, pp. 1365 of 1367.

M. S. Goodman et al., "The LAMBDANET Multiwavelength Network: Architecture, Applications, and Demonstrations", IEEE Journal on Selected Areas in Communications, vol. 8, No. 6, Aug. 1990, pp. 995 of 1004.

C. A. Turkatte, "Examining the Benefits of Tunable Lasers for Provisioning Bandwidth on Demand", EuroForum Optical Components, Feb. 2001, pp. 1 of 10.

R. Plastow, "Tunable Lasers and Future Optical Networks", Forum–Tunable Laser, Aug. 2000, pp. 58 of 62.

Elizabeth Bruce, "Tunable Lasers", Communications, IEEE Spectrum, Feb. 2002, pp. 35 of 39.

M. G. Littman et al., "Spectrally Narrow Pulsed Dye Laser without Beam Expander", Applied Optics, vol. 17, No. 14, Jul. 15, 1998, pp. 2224 of 2227.

Apte et al., "Deformable Grating Light Valves for High Resolution Displays," Solid State Actuator Workshop, Hilton Head, South Carolina, Jun. 13–16, 1994.

Sene et al., "Polysilicon micromechanical gratings for optical modulation," Sensors and Actuators, vol. A57, pp. 145–151, 1996.

Amm et al., "Invited Paper: Grating Light Valve™ Technology: Update and Novel Applications," SID Digest, vol. 29, 1998.

Development of Digital MEMS–Based Display Technology Promises Improved Resolution, Contrast, and Speed, XP–000730009, 1997, pp. 33 of 34.

"Micromachined Opto/Electro/Mechanical Systems," Electronic Systems, NASA Tech Briefs, Mar. 1997, pp. 50 & 52.

S.T. Pai, et al., "Electromigration in Metals", Received Jun. 4, 1976, p. 103–115.

Olga B. Spahn, et al., "High Optical Power Handling of Pop–Up Microelectromechanical Mirrors", Sandia National Laboratories, IEEE 2000, p. 51–52.

David M. Burns, et al. "Optical Power Induced Damage to Microelectromechanical Mirrors", Sensors and Actuators A 70, 1998, p. 6–14.

V.S. Aliev et al., "Development of Si(100) surface roughness at the initial stage of etching in F2 and XeF2 gases: ellipsometric study," Surface Science 442 (1999), pp. 206–214.

Xuan–Qi Wang et al., "Gas–Phase Silicon Etching with Bromine Trifluoride," Depart. of Electrical Engineering, 136–93 California Institute of Technology, 1997 IEEE, pp. 1505–1508.

Harold F. Winters, "Etch products from the reaction of XeF2 with SiO2, Si3N4, SiC, and Si in the presence of Ion Bombardment," IBM Research Laboratory, 1983 American Vacuum Society, pp. 927–931.

Mehran Mehregany, "Microelectromechanical Systems," 1993 IEEE, pp. 14–22.

D. Moser et al., "A CMOS Compatible Thermally Excited Silicon Oxide Beam Resonator with Aluminum Mirror," Physical Electronics Laboratory, 1991 IEEE, pp. 547–550.

M. Parameswaran et al., "Commercial CMOS Fabricated Integrated Dynamic Thermal Scene Simulator," 1991 IEEE, pp. 29.4.1–29.4.4.

M. Parameswaran et al., "CMOS Electrothermal Microactuators," Depart. of Electrical Engineering, 1990 IEEE, pp. 128–131.

U. Streller et al., "Selectivity in dry etching of Si(100) with XeF2 and VUV light," Applied Surface Science 106, (1996), pp. 341–346.

M.J.M Vugts et al., "Si/XeF2 etching: Temperature dependence," 1996 American Vacuum Society, pp. 2766–2774.

P. Krummenacher et al., "Smart Temperature Sensor in CMOS Technology," Sensors and Actuators, A–21–A–23 (1990), pp. 636–638.

Henry Baltes, "CMOS as sensor technology," Sensors and Actuators A. 37–38, (1993), pp. 51–56.

Thomas Boltshauser et al., "Piezoresistive Membrane Hygrometers Based on IC Technology," Sensor and Materials, 5, 3, (1993), pp. 125–134.

Z. Parpia et al., "Modelling of CMOS Compatible High Voltage Device Structures," pp. 41–50.

Jon Gildemeister, "Xenon Difluoride Etching System," 1997, UC Berkeley MicroTabrication Manual Chapter 7.15, p. 2–5.

W. Reithmuller et al., "A smart accelerometer with on–chip electronics fabricated by a commercial CMOS process," Sensors and Actuators A. 31, (1992), 121–124.

W. Gopel et al., "Sensors– A Comprehensive Survey," vol. 7, Weinheim New York, 44 pgs.

D. E. Ibbotson et al., "Comparison of XeF2 and F–atom reations with Si and SiO2," 1984 American Institute of Physics, pp. 1129–1131.

D. E. Ibbotson et al,. "Plasmaless dry etching of silicon with fluorine–containing compounds," 1984 American Institute of Physics, pp. 2939–2942.

M.H. Hecht et al., "A novel x–ray photoelectron spectroscopy study of the AI/SiO2 interfaces," 1985 American Institute of Physics, pp. 5256–52616.

Daniel L. Flamm et al., "XeF2 and F–Atom Reactions with Si: Their Significance for Plasma Etching,," Solid State Technology, V. 26, #4, 4/83, pp. 117–121.

H.F. Winters et al., "The etching of silicon with XeF2 vapor," Appl. Phys. Lett. vol. 34, No. 1, Jan. 1979, pp. 70–73.

Wayne Bailey et al., "Microelectronic Structures and Microelectromechanical Devices for Optical Processing and Multimedia Applications," SPIE—The International Society for Optical Engineering, vol. 2641, Oct. 1995, 13 pgs.

David Moser et al., "CMOS Flow Sensors," 1993 Physical Electronics Lab, Swiss Federal Institute of Tech, Zurich, Switzerland, 195 pgs.

E. Hecht, "Optics", Addison–Wesley, $2^{nd}$ edition, 1987, Adelphi University, pp. 358–360.

T. Glaser et al., "Beam switching with binary single–order diffractive grating", XP–000802142, Optics Letters, Dec. 15, 1998, vol. 23, No. 24, pp. 1933 of 1935.

P. C. Kundu et al., "Reduction of Speckle Noise by Varying the Polarisation of Illuminating Beam", XP–002183475, Dept. of Applied Physics, Calcutta University, 1975, pp. 63–67.

J. W. Goodman, "Some Fundamental Properties of Speckle", XP–002181682; Dept. of Electrical Engineering, Stanford University, 1976, pp. 1146–1150.

Lingli Wang et al., "Speckle Reduction in Laser Projection Systems by Diffractive Optical Elements", XP–000754330, Applied Optics, Apr. 1, 1998, vol. 37, No. 10, pp. 1770–1775.

R.W. Corrigan et al., "Calibration of a Scanned Linear Grating Light–Valve, Projection System for E–Cinema Applications", Silicon Light Machines, SID'99, San Jose, CA, 27 pgs, 1999.

R.W. Corrigan et al., "Calibration of a Scanned Linear Grating Light–Valve, Projection System", Silicon Light Machines, San Jose, CA, 4 pgs, May 18, 1999.

"Introduction to Cryptography", http://www.ssh.fi/tech/crpto/into.html, 35 pgs, Jun. 21, 1999.

"Deep Sky Black," Equinox Interscience, www.eisci.com/deepsky.html, 1997.

"Absorptive Neutral Density Filters," Newport Corp., Irvine, CA, www.newport.com, May 7, 1999.

"High Energy Variable Attenuators," Newport Corp., Irvine, CA, www.newport.com, May 7, 1999.

"Neutral–Density Filters," New Focus, Inc., Santa Clara, CA, www.newfocus.com, May 7, 1999.

J. Hawkes et al., "Laser Theory and Practice," Prentice Hall, New York, 1995, pp. 407–408.

C. Tew et al., "Electronic Control of a Digital Micromirror Device for Projection Displays", Proceedings of the 1994 IEEE International Solid–State Circuits Conference, 1994.

Henck, S.A., "Lubrication of Digital Micromirror Devices™", Tribology Letters, No. 3, pp. 239–247, 1997.

K. W. Goossen et al., "Silicon Modulator Based on Mechanically–Active Anti–Reflection Layer with 1 Mbit/sec Capability for Fiber–in–the–Loop Applications", IEEE Protonics Technology Letters, vol. 6, No. 9, Sep. 1994, pp. 1119–1121.

J. A. Walker et al., "Demonstration of a Gain Flattened Optical Amplifier with Micromechanical Equalizer Element", Lucent Technologies, pp. 13–14.

A. P. Payne et al., "Resonance Measurements of Stresses in $Al/Si_3N_4$ Micro–Ribbons", Silicon Light Machines, Sep. 22, 1999, 11 pgs.

M. W. Miles, "A New Reflective FPD Technology Using Interferometric Modulation", 4 pgs.

N. A. Riza et al., "Digitally Controlled Fault–Tolerant Multiwavelength Programmable Fiber–Optic Attenuator Using a Two–Dimensional Digital Micromirror Device", Optics Letters, Mar. 1, 1999, vol. 24, No. 5, pp. 282–284.

N. A. Riza et al., "Synchronous Amplitude and Time Control for an Optimum Dynamic Range Variable Photonic D lay Line", Applied Optics, Apr. 10, 1999, vol. 38, No. 11, pp. 2309–2318.

P. Alvelda et al., "44.4: Ferroelectric Microdisplays Using Distortion–Compensated Pixel Layouts", SID 95 Digest, XP 2020715, pp. 931–933.

\* cited by examiner

| FIG. 2A | FIG. 2B | FIG. 2C |
FIG. 2
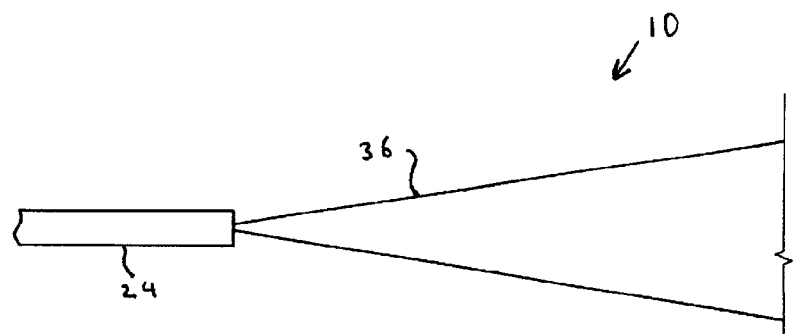
FIG. 2A
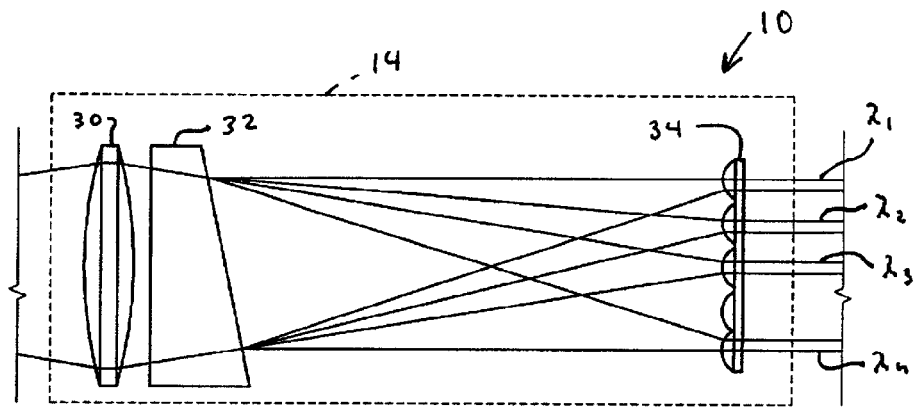
FIG. 2B
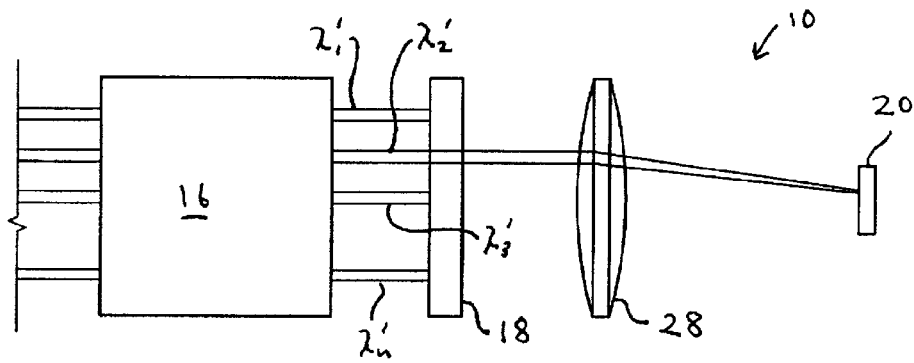
FIG. 2C

METHOD AND APPARATUS FOR MEASURING WAVELENGTH JITTER OF LIGHT SIGNAL

FIELD OF THE INVENTION

This invention relates to the field of optical communication. More particularly, this invention relates to the field of optical communication where there is a need to measure wavelength jitter.

BACKGROUND OF THE INVENTION

In WDM (wavelength division multiplexing) optical communication, multiple wavelengths of light each carry a communication signal. Each of the multiple wavelengths of light forms a channel. In DWDM (dense WDM) optical communication, a subset of the WDM optical communication, the channels are spaced close together. A typical DWDM application operates at a wavelength band about 1,550 nm, has 40 channels, and has spacing of 0.4 nm between adjacent channels.

In the WDM optical communication there is a need to monitor the wavelength of each channel. This is especially required for the DWDM optical communication because of the close spacing between adjacent channels.

A method of monitoring wavelength of each of the channels employs a scanning source, a Michelson interferometer, and a detector. The scanning source individually directs each of the channels sequentially to the Michelson interferometer. The Michelson interferometer sequentially directs interference fringe patterns corresponding to each of the channels to the detector. The detector detects the interference fringe pattern, which are electronically compared to desired interference fringe patterns.

There are a number of problems associated with this method. An instrument employing this method is expensive. Further, because the method employs a scanning source, the method exhibits a slow update rate. Moreover, as the channel spacing has decreased in the DWDM optical communication, a dynamic range provided by the method is proving to be insufficient.

The Michelson interferometer is an amplitude splitting interferometer which provides information about light which enters it. The Michelson interferometer includes a beam splitter, first and second mirrors, and a focusing lens. Light entering the Michelson interferometer is split by the beam splitter into a transmitted light and a reflected light. The reflected light then reflects from the first mirror and returns to the beam splitter. Meanwhile the transmitted light reflects from the second mirror and returns to the beam splitter. The beam splitter combines the transmitted light and the reflected light into interference light which is focused by the focusing lens into an interference pattern. As wavelength of the light changes the interference pattern changes.

A Mach-Zehnder interferometer is an amplitude splitting interferometer which provides information about an object placed within a first leg of the Mach-Zehnder interferometer rather than information about light entering the Mach-Zehnder interferometer. For example, the Mach-Zehnder interferometer is often used to observe a gas flow pattern caused by density variations in the gas flow pattern. The first leg of the Mach-Zehnder interferometer passes through the gas flow patterns while a second leg of the interferometer does not pass through the gas flow pattern. First light, diffracted by the gas flow pattern within the first leg, interferes with second light which traverses the second leg. A focusing lens produces an image of the gas flow pattern by focusing the first and second light in an image plane.

What is needed is a method of monitoring channel wavelength that is less expensive.

What is needed is a method of monitoring channel wavelength that exhibits a better update rate.

What is needed is a method of monitoring channel wavelength that exhibits a better dynamic range.

What is needed is a Mach-Zehnder interferometer which provides information about light entering the Mach-Zehnder interferometer rather than information about an object within a leg of the Mach-Zehnder interferometer.

SUMMARY OF THE INVENTION

An apparatus for detecting wavelength change of a first light signal of the present invention comprises an amplitude splitting interferometer and a detector. The amplitude splitting interferometer comprises first and second optical paths. The first optical path has a first index of refraction that varies with wavelength over a first wavelength band. The second optical path has a second index of refraction that is relatively constant over the first wavelength band. In operation the first light signal enters and exits the amplitude splitting interferometer forming interference light. The interference light couples to the detector which detects the wavelength change of the first light signal from the interference light.

An interferometer of the present invention comprises a first beam splitter, third and fourth optical paths, and a second beam splitter. The third optical path is optically coupled to the first beam splitter and has a third index of refraction that varies with wavelength over a second wavelength band. The fourth optical path is optically coupled to the first beam splitter and has a fourth index of refraction that is relatively constant over the second wavelength band. The second beam splitter is optically coupled to the first and second optical paths such that in operation an incident light enters the first beam splitter and exits the second beam splitter forming an output light and further such that in operation a change in wavelength of the incident light within the wavelength band causes a change in interference of the output light.

BRIEF DESCRIPTION OF THE DRAWINGS

FIG. 2 illustrates an optical layout of the preferred channel monitor of the present invention.

DETAILED DESCRIPTION OF THE PREFERRED EMBODIMENT

Figure 1:
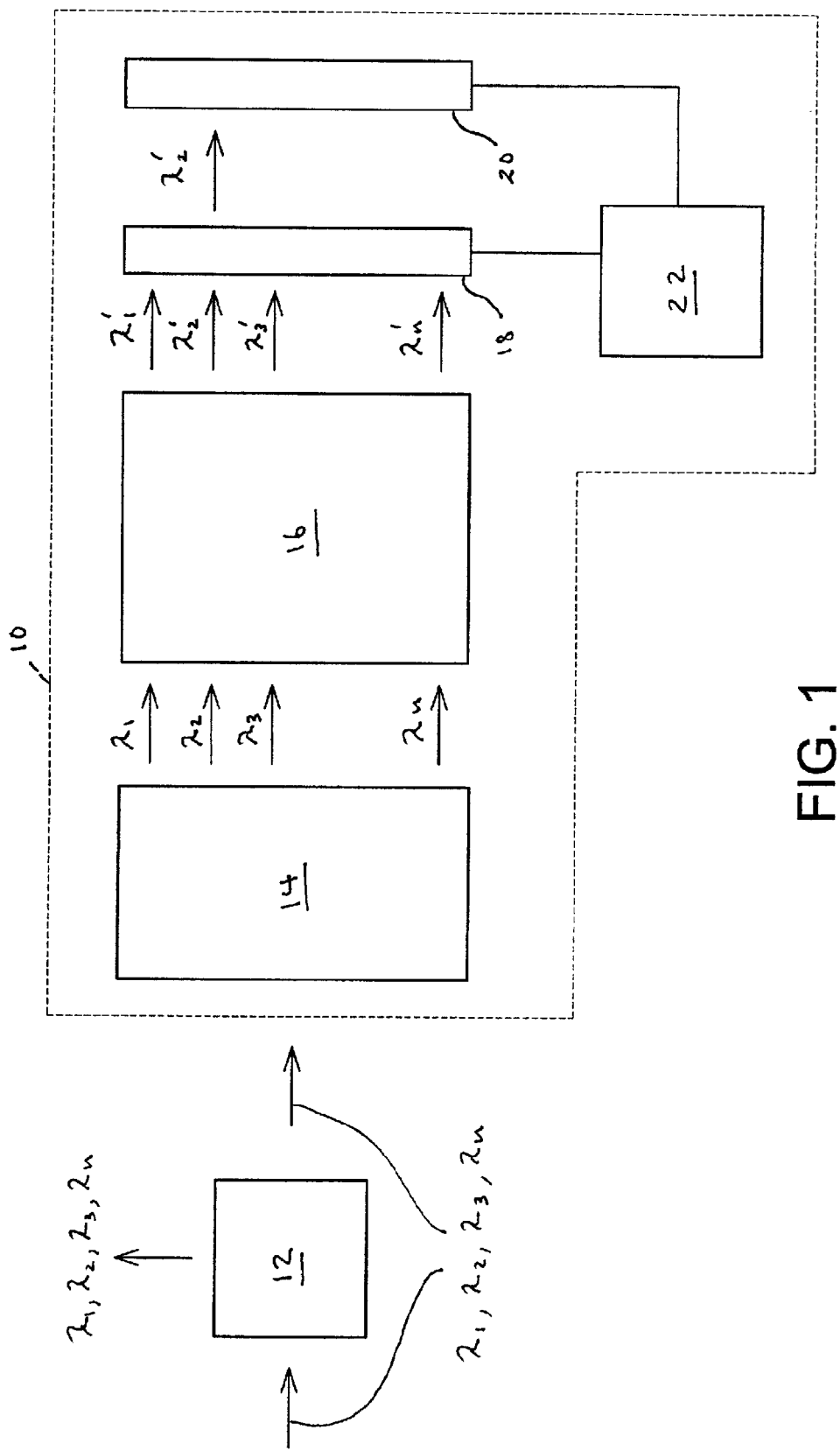
FIG. 1 schematically illustrates the preferred channel monitor of the present invention.

The preferred channel monitor and a 1% splitter of the present invention is schematically illustrated in FIG. 1. The preferred channel monitor 10 includes dispersion and collimation optics 14, the preferred interferometer 16, a light modulator 18, a detector 20, and electronics 22. The 1% splitter 12 is preferably optically coupled to an input optical fiber, an output optical fiber, and the dispersion and collimation optics 14. The dispersion and collimation optics 14 are optically coupled to the preferred interferometer 16. The preferred interferometer 16 is optically coupled to the light modulator 18. The light modulator 18 is optically coupled to detector 20. The light modulator 18 and the detector 20 are electrically coupled to the electronics 22.

The dispersion and collimation optics 14 preferably comprise a grism. The grism comprises a combination of a prism and a diffraction grating, where a face of the prism comprises the diffraction grating. Alternatively, the dispersion and collimation optics 14 comprise the diffraction grating. Further alternatively, the dispersion and collimation optics 14 comprise the prism.

In operation, the input optical fiber carries a WDM signal including first, second, third, and nth wavelength signals, $\lambda_1$, $\lambda_2$, $\lambda_3$, and $\lambda_n$, for a total of n signals. For example, in a typical DWDM application operating at 1550 nm and having 40 channels separated by 0.4 nm, n equals 40. The 1% splitter 12 couples most of the WDM signal to the output optical fiber and couples a small portion of the WDM signal to the dispersion and collimation optics 14. Thus, a reduced strength WDM signal including the first, second, third, and nth wavelength signals, $\lambda_1$, $\lambda_2$, $\lambda_3$, and $\lambda_n$ is coupled to the dispersion and collimation optics 14. The dispersion and collimation optics 14 spatially separate the first, second, third, and nth wavelength signals, $\lambda_1$, $\lambda_2$, $\lambda_3$, and $\lambda_n$ and preferably collimates the first, second, third, and nth wavelength signals, $\lambda_1$, $\lambda_2$, $\lambda_3$, and $\lambda_n$.

The preferred interferometer forms first, second, third, and nth interference signals, $\lambda_1'$, $\lambda_2'$, $\lambda_3'$, and $\lambda_n'$ from the first, second, third, and nth wavelength signals, $\lambda_1$, $\lambda_2$, $\lambda_3$, and $\lambda_n$. The preferred interferometer causes each of the first, second, third, and nth interference signals, $\lambda_1'$, $\lambda_2'$, $\lambda_3'$, and $\lambda_n'$ vary as a function of wavelength of each of the first, second, third, and nth wavelength signals, $\lambda_1$, $\lambda_2$, $\lambda_3$, and $\lambda_n$, respectively. Thus, for example, if the first wavelength signal $\lambda_1$ has a wavelength 0.4 nm less than the second wavelength signal $\lambda_2$ and the second wavelength signal $\lambda_2$ has a wavelength 0.4 nm less than the third wavelength signal $\lambda_3$, a wavelength shift of 0.04 nm of the second wavelength signal $\lambda_2$ towards the first wavelength signal $\lambda_1$ and away from the third wavelength signal $\lambda_3$ causes a change in the second interference signal $\lambda_2'$.

The light modulator 18, driven by the electronics 22, directs at least one of the first, second, third, and nth interference signals, $\lambda_1'$, $\lambda_2'$, $\lambda_3'$, and $\lambda_n'$ to the detector 20 while causing a remainder of the first, second, third, and nth interference signals, $\lambda_1'$, $\lambda_2'$, $\lambda_3'$, and $\lambda_n'$ to not be directed to the detector 20 at a given time. For example, in FIG. 1, the second interference signal $\lambda_2'$ is directed to the detector 20 while the first, third, and nth interference signals, $\lambda_1'$, $\lambda_3'$, and $\lambda_n'$, are not directed to the detector 20. At a later time, the light modulator 18 directs at least one of the first, third, and nth interference signals, $\lambda_1'$, $\lambda_3'$, and $\lambda_n'$, to the detector 20 while causing the second interference signal $\lambda_2'$ to not be directed to the detector 20.

As depicted in FIG. 1, the detector 20 in conjunction with the electronics 22 senses the second interference signal $\lambda_2'$. Preferably, the detector 20 comprises a linear array of detecting elements and the second interference signal $\lambda_2'$ provides a fringe pattern, where the fringe pattern changes as the second interference signal $\lambda_2'$ changes. A shift of the fringe pattern along the linear array of detecting elements corresponds to a change in wavelength of the second wavelength signal $\lambda_2$. Often, the change in wavelength is referred to as wavelength jitter because the change in wavelength exhibits a fluctuation of the wavelength. Since the second interference signal $\lambda_2'$ provides the fringe pattern and because the linear array of detecting elements are preferably configured to detect the fringe pattern, the detector senses power fluctuation as well as the wavelength jitter.

Alternatively, the detector 20 comprises a detecting element and the second interference signal $\lambda_2'$ provides an intensity level, where the intensity level changes as the second interference signal $\lambda_2'$ changes. A change of the intensity level at the detecting element corresponds to the change in wavelength of the second wavelength signal $\lambda_2$. In this alternative, a separate arrangement (not shown) provides the power fluctuation of the second wavelength signal $\lambda_2$.

An optical layout of the preferred channel monitor 10 is illustrated in FIG. 2. The preferred channel monitor 10 includes an optical fiber 24, the dispersion and collimation optics 14, the preferred interferometer 16, the light modulator 18, a focusing lens 28, and the detector 20. The optical fiber 24 optically couples the 1% splitter 12 (FIG. 1) to the dispersion and collimation optics 14. The dispersion and collimation optics 14 preferably comprise an objective lens 30, the grism 32, and a linear array of collimating micro-lenses 34.

In operation, the WDM signal 36 exits the optical fiber 24 and couples to the objective lens 30. The objective lens 30 focuses the WDM signal 36. The grism 32 spatially separates the WDM signal 36 into the first, second, third, and nth wavelength signals, $\lambda_1$, $\lambda_2$, $\lambda_3$, and $\lambda_n$. The linear array of collimating micro-lenses 34 collimates the first, second, third, and nth wavelength signals, $\lambda_1$, $\lambda_2$, $\lambda_3$, and $\lambda_n$, which couple to the preferred interferometer 16. In order to provide a more compact package size, mirrors (not shown) preferably fold the optical layout. Alternatively, the mirrors are not used.

The preferred interferometer 16 is an amplitude splitting interferometer which splits each of the first, second, third, and nth wavelength signals, $\lambda_1$, $\lambda_2$, $\lambda_3$, and $\lambda_n$, into divided signals, causes the divided signals to travel first and second optical paths, respectively, and recombines the divided signals into the first, second, third, and nth interference signals, $\lambda_1'$, $\lambda_2'$, $\lambda_3'$, and $\lambda_n'$, which exit the preferred interferometer 16. Next, the first, second, third, and nth interference signals, $\lambda_1'$, $\lambda_2'$, $\lambda_3'$, and $\lambda_n'$ couple to the light modulator 18. Preferably, the light modulator 18 is a diffractive light modulator. Alternatively, the light modulator 18 is a reflective light modulator. Further alternatively, the light modulator 18 is a transmissive light modulator.

The light modulator 18 preferably directs at least one of the first, second, third, and nth interference signals, $\lambda_1'$, $\lambda_2'$, $\lambda_3'$, and $\lambda_n'$, to the focusing lens 28 as a collimated beam while causing a remainder of the first, second, third, and nth interference signals, $\lambda_1'$, $\lambda_2'$, $\lambda_3'$, and $\lambda_n'$ to not be directed to the focusing lens 28 as the collimated beam at a given time.

The light modulator 18 preferably reflects the second wavelength signal $\lambda_2$ while preferably diffracting the first, third, and nth interference signals, $\lambda_1'$, $\lambda_3'$, and $\lambda_n'$. Thus, the second interference signal $\lambda_2'$ following the light modulator 18 is the collimated beam while the first, third, and nth interference signals, $\lambda_1'$, $\lambda_3'$, and $\lambda_n'$, following the light modulator 18 are diffracted beams (not shown). The focusing lens 28 then directs the second interference signal $\lambda_2'$ onto the detector 20 while causing the first, third, and nth interference signals, $\lambda_1'$, $\lambda_3'$, and $\lambda_n'$, to not be directed onto the detector 20. The detector 20 is located slightly away from a focal length of the focusing lens 28 in order to image the fringe pattern onto the linear array of detecting elements.

Preferably, the optical fiber 24 has an exit with an f/4 numerical aperture. Alternatively, the exit has a different numerical aperture. Preferably, the objective lens 30 is an f/5 objective lens with a focal length of 300 mm. Alternatively, the objective lens 30 is a different objective lens. Preferably, the grism 32 comprises a 10° angle between entrance and exit faces and comprises a grating with a period spacing of 2 μm on the exit face. Alternatively, the grism 32 comprises a different grism. Preferably, the linear array of collimating micro-lenses 34 comprises f/1 micro-lenses having a diameter of 0.250 mm. Alternatively, the linear array of micro-lenses 34 comprises different micro-lenses. Preferably, the focusing lens 28 comprises and f/2 focusing lens having a focal length of 20 mm. Alternatively, the focusing lens 28 comprises a different focusing lens.

Preferably, the detector 20 comprises the linear array of detecting elements. More preferably, the detector 20 comprises a four element linear array of InGaAs detecting elements. Alternatively, the detector 20 comprises a different array of detecting elements where the different array of detecting elements is selected from a group comprising the linear array of detecting elements and an area array of detecting elements. Further alternatively, the detector 20 comprises the detecting element.

Preferably, the electronics 22 (FIG. 1) comprise driving electronics for the light modulator 18 and signal processing electronics for processing information from the detector 20. Preferably, the driving electronics modulate channels of the light modulator 18 with unique signatures and the signal processing electronics comprise a lock-in amplifier tuned to the unique signatures. Alternatively, the electronics 22 (FIG. 1) comprise different driving electronics. Further alternatively, the signal processing electronics comprise different signal processing electronics.

Figure 3:
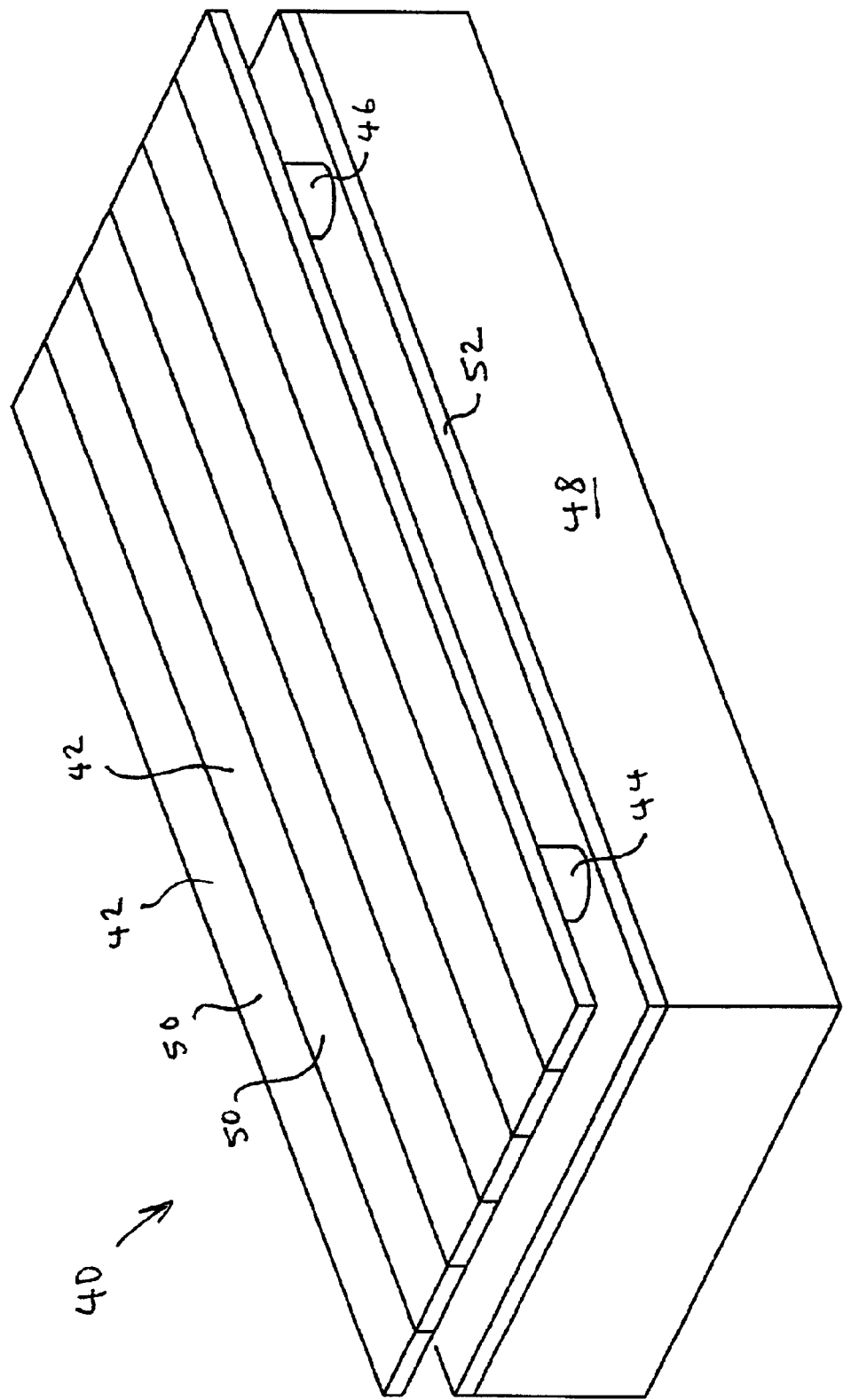
FIG. 3 illustrates an isometric view of a grating light valve of the present invention.

Preferably, the diffractive light modulator is a grating light valve. The grating light valve of the present invention is isometrically illustrated in FIG. 3. The grating light valve 40 preferably comprises elongated elements 42 suspended by first and second posts, 44 and 46, above a substrate 48. The elongated elements 42 comprise a conducting and reflecting surface 50. The substrate comprises a conductor 52. In operation, the grating light valve operates to produce modulated light selected from a reflection mode and a diffraction mode.

Figure 4A:
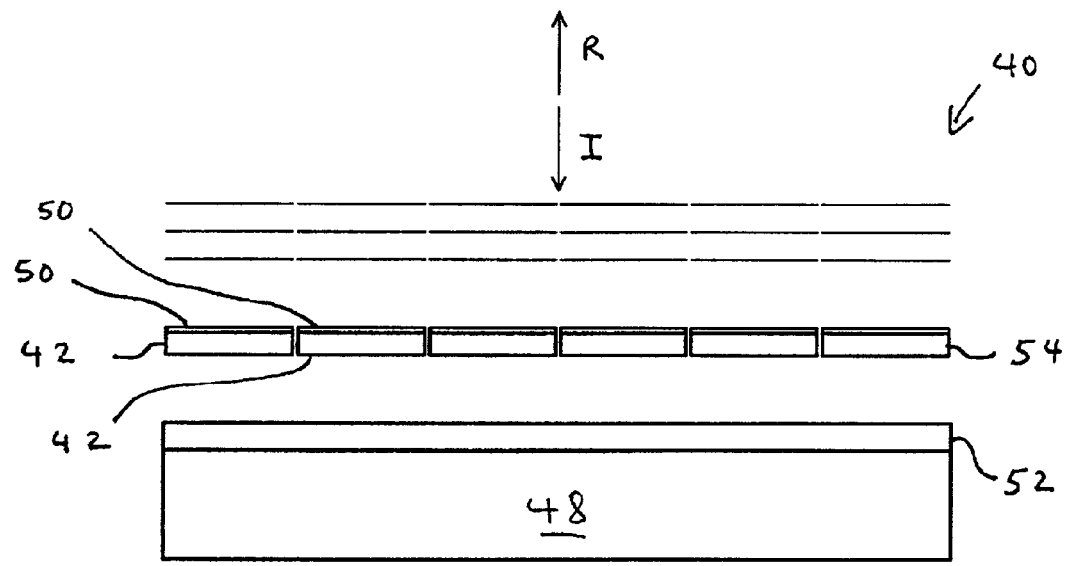
FIGS. 4A and 4B illustrate a cross-section of the grating light valve of the present invention in a reflecting mode and a diffracting mode, respectively.
Figure 4B:
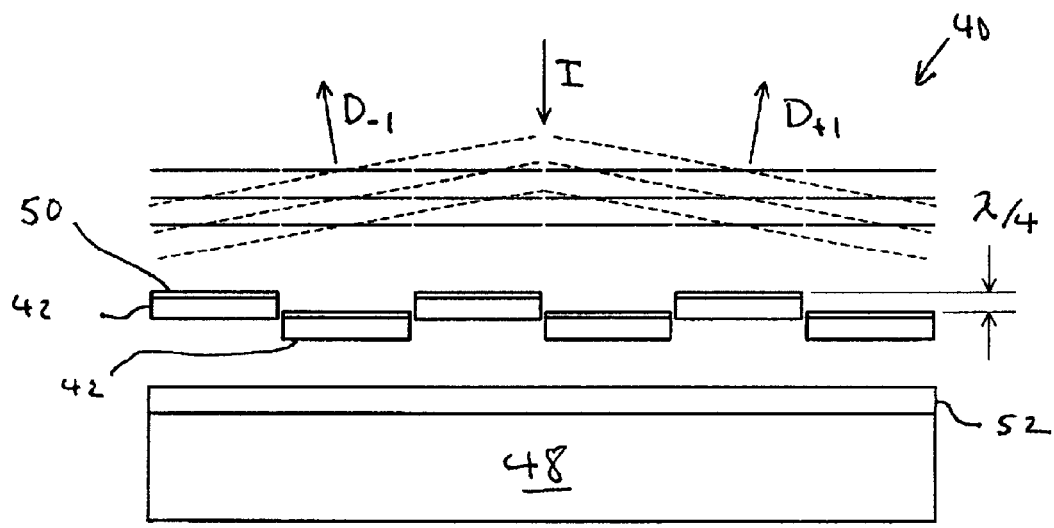

A cross-section of the grating light valve 40 of the present invention is further illustrated in FIGS. 4A and 4B. The grating light valve 40 comprises the elongated elements 42 suspended above the substrate 48. The elongated elements comprise the conducting and reflecting surface 50 and a resilient material 54. The substrate 48 comprises the conductor 52.

FIG. 4A depicts the grating light valve 40 in the reflection mode. In the reflection mode, the conducting and reflecting surfaces 50 of the elongated elements 42 form a plane so that incident light I reflects from the elongated elements 42 to produce reflected light R.

FIG. 4B depicts the grating light valve 40 in the diffraction mode. In the diffraction mode, an electrical bias causes alternate ones of the elongated elements 42 to move toward the substrate 48. The electrical bias is applied between the reflecting and conducting surfaces 50 of the alternate ones of the elongated elements 42 and the conductor 52. The electrical bias results in a height difference of a quarter wavelength $\lambda/4$ of the incident light I between the alternate ones of the elongated elements 42 and non-biased ones of the elongated elements 42. The height difference of the quarter wavelength $\lambda/4$ produces diffracted light including plus one and minus one diffraction orders, $D_{+1}$ and $D_{-1}$.

Preferably, a particular light signal modulator for a particular light signal comprises three pairs of the elongated elements 42. More preferably, the particular light signal modulator comprises six pairs of the elongated elements 42. Alternatively, the particular light signal modulator comprises two pairs of the elongated elements 42.

Figure 5:
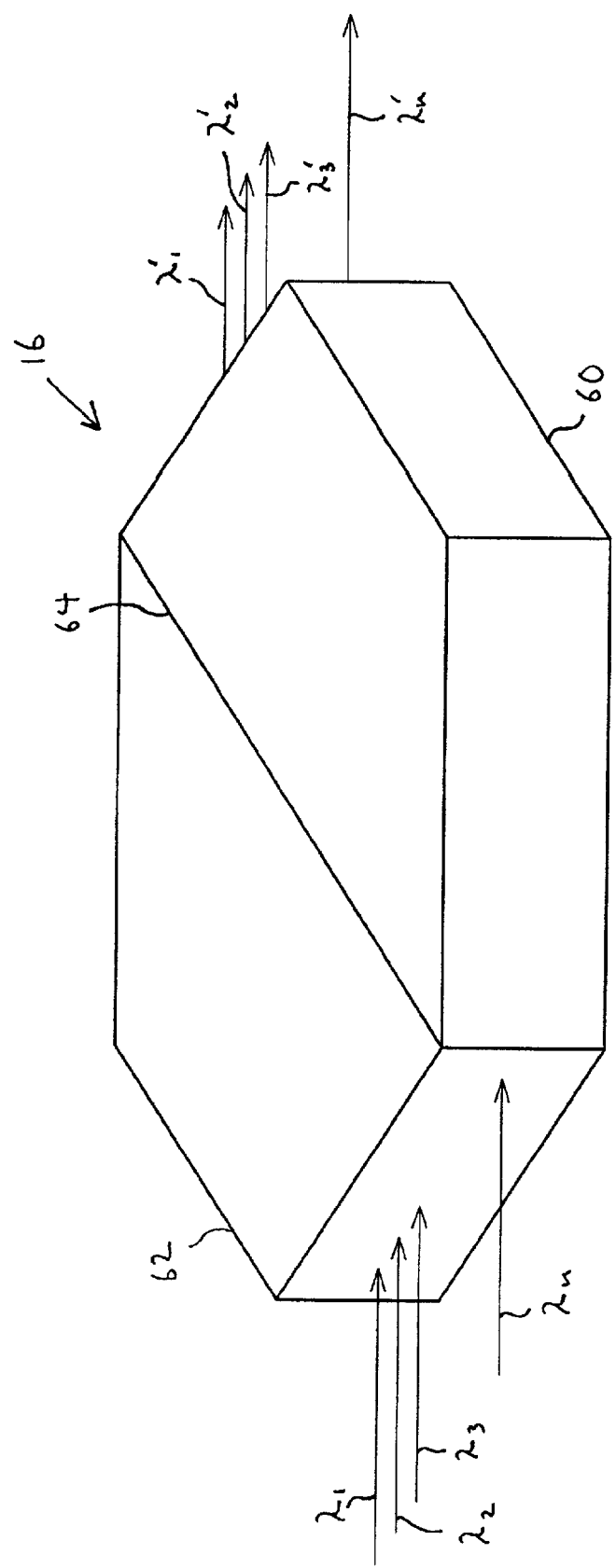
FIG. 5 illustrates an isometric view of the preferred interferometer of the present invention.

The preferred interferometer 16 of the present invention is isometrically illustrated in FIG. 5. The preferred interferometer 16 comprises a first prism 60 and a second prism 62. Preferably, the first prism 60 and the second prism 62 are optically cemented together to form a beam splitting surface 64. Preferably, the first prism 60 comprises fused silica. The fused silica exhibits an approximately constant index of refraction over a wavelength band about 1,550 nm. Alternatively, the first prism 60 comprises a first different material that exhibits the approximately constant index of refraction over the wavelength band about 1,550 nm. Preferably, the second prism 62 comprises optical grade germanium. The optical grade germanium exhibits an index of refraction which varies with wavelength over the wavelength band about 1,550 nm. Alternatively, the second prism 62 comprises a second different material that exhibits the index of refraction which varies with wavelength over the wavelength band about 1,550 nm.

It will be readily apparent to one skilled in the art that if the preferred interferometer 16 is to be used to detect a wavelength change within a different wavelength band about a different wavelength, other materials are likely to be more appropriate than the fused silica and the optical grade germanium for the first and second prisms, 60 and 62, respectively.

Figure 6:
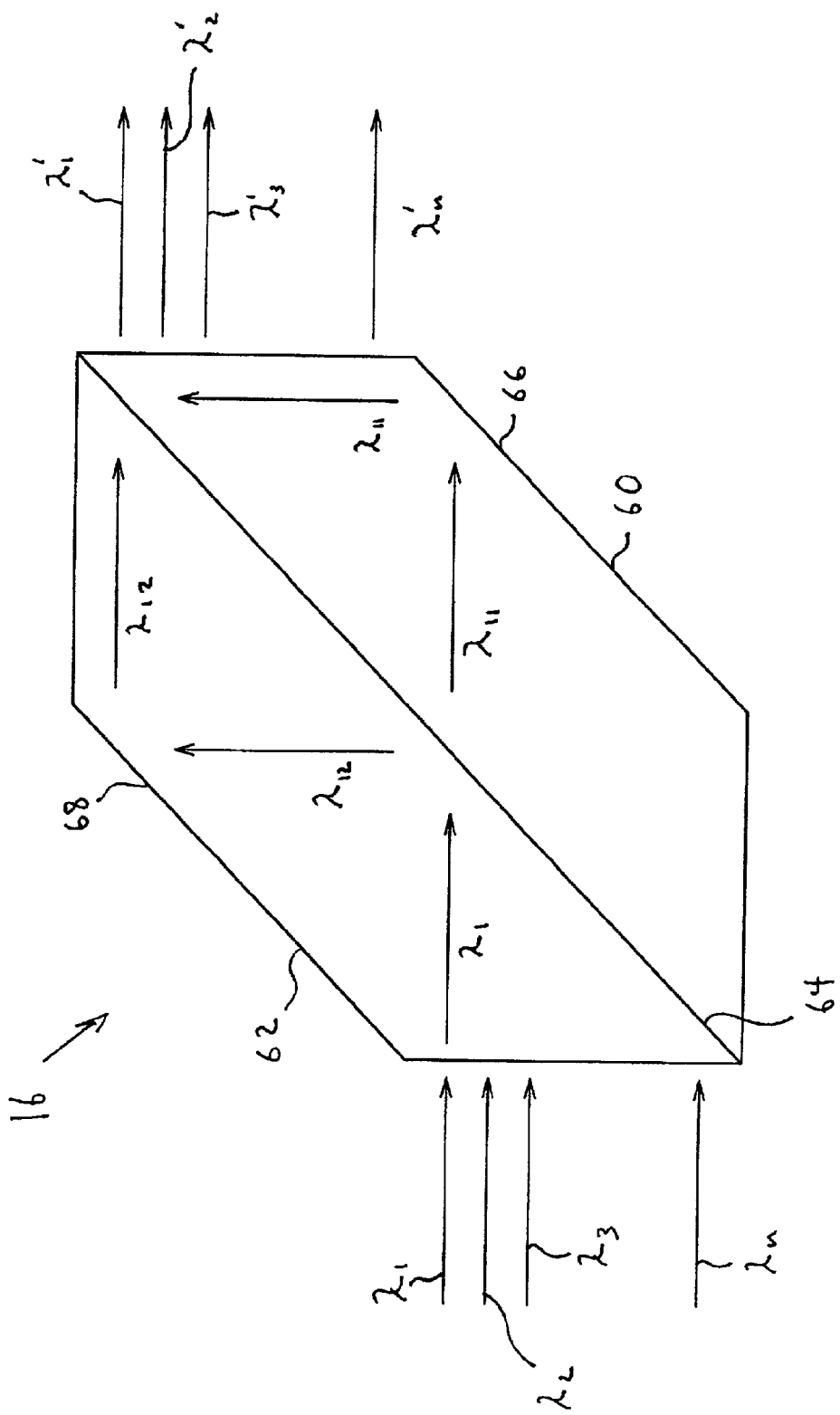
FIG. 6 illustrates a plan view of the preferred interferometer of the present invention.

A top view of the preferred interferometer 16 is illustrated in FIG. 6. The preferred interferometer comprises the first and second prisms, 60 and 62, and the beam splitting surface 64. In operation, the first, second, third, and nth wavelength signals, $\lambda_1$, $\lambda_2$, $\lambda_3$, and $\lambda_n$, enter the preferred interferometer 16. In order to simplify description of operation of the preferred interferometer 16, only the first light signal $\lambda_1$ is traced through the preferred interferometer 16. The first light signal $\lambda_1$ is split by the beam splitting surface 64 into a reference light signal $\lambda_{11}$, which propagates within the first prism 60, and a varied light signal $\lambda_{12}$, which propagates within the second prism 62. The reference light signal $\lambda_{11}$ reflects from a first total internal reflection surface 66 while the varied light signal $\lambda_{12}$ reflects from a second total internal reflection surface 68. Following these reflections, the beam splitting surface 64 combines the reference light signal $\lambda_{11}$ and the varied light signal $\lambda_{12}$ to form the first interference signal $\lambda_1'$, which exits the preferred interferometer 16. Similarly, the second, third, and nth interference signals $\lambda_2'$, $\lambda_3'$, and $\lambda_n'$, are formed by the preferred interferometer 16. By inducing a slight misalignment between the reference light signal $\lambda_{11}$ and the varied light signal $\lambda_{12}$, the first interference signal $\lambda_1'$ exhibits the fringe pattern. Otherwise, the first interference signal $\lambda_1'$ exhibits an intensity ranging from bright to dark. The second, third, and nth interference signals $\lambda_2'$, $\lambda_3'$, and $\lambda_n'$, are similarly formed by the preferred interferometer 16.

Mathematically, the fringe pattern produced by the preferred interferometer 16 is given by:

$$I(x)=(I_0/2)[1+\cos((2\pi/\lambda)x\sin\theta+\phi)]$$

where $I(x)$ is intensity across fringe pattern, $I_0$ is maximum intensity of the fringe pattern, $\lambda$ is wavelength, $\theta$ is angle between interference light producing the fringe pattern, and $\phi$ is phase difference induced by change in wavelength. The phase difference $\phi$ is given by:

$$\phi=(2\pi/\lambda)(n_1 d_1 - n_2 d_2)$$

where $n_1$ is a first refractive index of the first prism 60, $n_2$ is a second refractive index of the second prism 62, $d_1$ is a first path length within the first prism 60 for the reference light signal $\lambda_{11}$, and $d_2$ is a second path length within the second prism 62 for the varied light signal $\lambda_{12}$.

For a slight change in the wavelength $\lambda$, change in the $(2\pi/\lambda)\times\sin\theta$ term for the fringe pattern is negligible. Thus, a change from a bright fringe to a dark fringe occurs when the phase difference $\phi$ equals $\pi$. For a 0.04 nm change in the wavelength $\lambda$ near 1,550 nm, the first index of refraction $n_1$ for the fused silica is constant while the second index of refraction $n_2$ for the germanium changes by 0.0000125. Setting the first and second path lengths, $d_1$ and $d_2$, equal to a path length d, setting the wavelength $\lambda$ equal to 1,550 nm, and solving for the path length d, gives the path length d equal to 62 mm.

A first alternative channel monitor of the present invention comprises the preferred interferometer 16 and the detector 20. In the first alternative channel monitor a fourth light signal enters the preferred interferometer 16 and a fourth interference signal exits the preferred interferometer. The detector 20 detects the fourth interference signal as the fringe pattern and consequently detects the change in wavelength of the fourth light signal. Alternatively, the detector 20 detects the intensity level.

A first alternative interferometer of the present invention comprises a first beam splitter, first and second optical paths, and a second beam splitter. The first optical path comprising a first material which has the approximately constant index of refraction over the wavelength band. The second optical path comprising a second material having the index of refraction which varies over the wavelength band. The first beam splitter dividing an input light into a first light which travels along the first optical path and a second light which travels along the second optical path. The second beam splitter combining the first and second light into an interference light.

It will be readily apparent to one skilled in the art that other various modifications may be made to the preferred embodiment without departing from the spirit and scope of the invention as defined by the appended claims.

We claim:

1. An apparatus for detecting wavelength change of a first light signal comprising:
   a. an amplitude splitting interferometer comprising first and second optical paths, the first optical path having a first index of refraction that varies with wavelength over a wavelength band, the second optical path having a second index of refraction that is relatively constant over the wavelength band, such that in operation the first light signal enters and exits the amplitude splitting interferometer, whereby interference light is formed; and
   b. a detector optically coupled to the amplitude splitting interferometer such that in operation the detector detects the wavelength change of the first light signal from the interference light.

2. The apparatus of claim 1 further comprising a light modulator coupling the amplitude splitting interferometer to the detector such that in operation a second light signal having a wavelength different from the first light signal is separated from the first light signal by the light modulator.

3. The apparatus of claim 2 wherein the light modulator comprises a diffractive light modulator.

4. The apparatus of claim 3 wherein the diffractive light modulator comprises a grating light valve.

5. The apparatus of claim 2 further comprising a dispersion device coupling the first and second light signals to the amplitude splitting interferometer, the dispersion device spatially separating the first and second light signals.

6. The apparatus of claim 5 wherein the dispersion device comprise a grism.

7. The apparatus of claim 5 wherein the dispersion device comprise a grating.

8. The apparatus of claim 5 wherein the dispersion device comprise a prism.

9. The apparatus of claim 5 further comprising a collimation lens optically coupling the dispersion device to the amplitude splitting interferometer.

10. The apparatus of claim 9 wherein the collimation lens comprises a micro-lens array.

11. The apparatus of claim 9 further comprising a splitter coupling the first and second light signals to the collimation lens, the splitter separating the first and second light signals from first and second transmission light signals, respectively.

12. The apparatus of claim 1 further comprising a light modulator optically coupled to the amplitude splitting interferometer such that in operation a second light signal having a wavelength different from the first light signal is separated from the first light signal prior to the first light signal entering the amplitude splitting interferometer.

13. The apparatus of claim 12 wherein the light modulator comprises a diffractive light modulator.

14. The apparatus of claim 13 wherein the diffractive light modulator comprises a grating light valve.

15. The apparatus of claim 1 wherein the amplitude splitting interferometer further comprises:
   a. a first beam splitter optically coupled to first and second entrances of the first and second optical paths, respectively; and
   b. a second beam splitter optically coupled to first and second exits of the first and second optical paths, respectively.

16. The apparatus of claim 1 wherein:
   a. the first optical path of the amplitude splitting interferometer comprises a first prism; and
   b. the second optical path of the amplitude splitting interferometer comprises a second prism joined to the first prism, whereby a beam splitting surface is formed.

17. The apparatus of claim 1 wherein the interferometer produces a fringe pattern and further wherein the detector comprises a detector array such that in operation the detector array detects the fringe pattern in order to measure a power change and the wavelength change.

18. The apparatus of claim 1 wherein the interferometer does not produce a fringe pattern.

19. The apparatus of claim 18 wherein power sensing optics coupled to the detector provide an amplitude change measurement of the first light signal.

20. The apparatus of claim 18 wherein a light signal amplitude adjustment arrangement adjusts an amplitude of the first light signal prior to the first light signal reaching the detector so that the first light signal has a reference amplitude upon reaching the detector.

21. An apparatus for detecting wavelength change of a light signal comprising:
   a. means for dividing the light signal into first and second lights;
   b. first means for causing the first light to travel along a first optical path having a first index of refraction that varies with wavelength over a wavelength band;
   c. second means for causing the second light to travel along a second optical path having a second index of refraction that is relatively constant over the wavelength band;
   d. means for combining the first and second lights into an output light, the output light exhibiting a change in interference as wavelength of the light signal changes; and
   e. means for detecting the change in the interference as the wavelength of the light signal changes.

22. An apparatus for detecting wavelength jitter comprising:
   a. an amplitude splitting interferometer comprising first and second optical paths, the first optical path having a first index of refraction that varies with wavelength over a wavelength band, the second optical path having a second index of refraction that is relatively constant over the wavelength band, such that in operation first and second light signals enter and exit the amplitude splitting interferometer, whereby first and second interference light is formed;
   b. a light modulator optically coupled to the amplitude splitting interferometer such that in operation the light modulator separates the second interference light from the first interference light; and
   c. a detector optically coupled to the light modulator such that in operation the detector detects wavelength jitter from the first interference light.

23. An apparatus for detecting wavelength jitter comprising:
   a. a light modulator such that in operation the light modulator couples to first and second light signals and further such that in operation the light modulator separates the second light signal from the first light signal;
   b. an amplitude splitting interferometer coupled to the light modulator, the amplitude splitting interferometer comprising first and second optical paths, the first optical path having a first index of refraction that varies with wavelength over a wavelength band, the second optical path having a second index of refraction that is relatively constant over the wavelength band, such that in operation the first light signals enters and exits the amplitude splitting interferometer, whereby an interference light is formed; and
   c. a detector optically coupled to the amplitude splitting interferometer such that in operation the detector detects wavelength jitter from the interference light.

24. An interferometer comprising:
   a. a first beam splitter;
   b. a first optical path optically coupled to the first beam splitter and having a first index of refraction that varies with wavelength over a wavelength band;
   c. a second optical path optically coupled to the first beam splitter and having a second index of refraction that is relatively constant over the wavelength band; and
   d. a second beam splitter optically coupled to the first and second optical paths such that in operation an incident light enters the first beam splitter and exits the second beam splitter, whereby an output light is formed, and further such that in operation a change in wavelength of the incident light within the wavelength band causes a change in interference of the output light.

25. The interferometer of claim 24 wherein the first optical path comprises germanium.

26. The interferometer of claim 24 wherein the second optical path comprises fused silica.

27. The interferometer of claim 24 wherein the interference exhibits a fringe pattern.

28. The interferometer of claim 24 wherein the interference does not exhibit a fringe pattern.

29. An interferometer comprising:
   a. means for dividing an incident light into first and second lights;
   b. first means for causing the first light to travel along a first optical path having a first index of refraction that varies with wavelength over a wavelength band;
   c. second means for causing the second light to travel along a second optical path having a second index of refraction that is relatively constant over the wavelength band; and
   d. means for combining the first and second lights into an output light, the output light exhibiting a change in interference as wavelength of the incident light changes.

30. An interferometer comprising:
   a. a first prism having a first index of refraction that varies with wavelength over a wavelength band, the first prism including a first total internal reflection surface;
   b. a second prism joined to the first prism to form a beam splitting surface, the second prism having a second index of refraction that is relatively constant over the wavelength band, the second prism including a second total internal reflection surface, such that in operation an incident light enters the interferometer and exits the interferometer, whereby an output light is formed, and further such that in operation the output light exhibits a change in interference as wavelength of the incident light changes.

31. The interferometer of claim 30 wherein optical cement joins the second prism to the first prism.

* * * * *